United States Patent
Gilad et al.

(10) Patent No.: US 8,341,322 B2
(45) Date of Patent: Dec. 25, 2012

(54) DEVICE AND METHOD FOR SCHEDULING TRANSACTIONS OVER A DEEP PIPELINED COMPONENT

(75) Inventors: Dror Gilad, Karmey Yosef (IL); Ori Goren, Kibutz Ruchama (IL); Alon Shoshani, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 601 days.

(21) Appl. No.: 12/529,749

(22) PCT Filed: Mar. 7, 2007

(86) PCT No.: PCT/IB2007/050756
§ 371 (c)(1), (2), (4) Date: Sep. 3, 2009

(87) PCT Pub. No.: WO2008/107739
PCT Pub. Date: Sep. 12, 2008

(65) Prior Publication Data
US 2010/0030940 A1    Feb. 4, 2010

(51) Int. Cl.
*G06F 13/14* (2006.01)
(52) U.S. Cl. .................. 710/305; 710/35; 711/112
(58) Field of Classification Search .................. 710/305, 710/35; 370/764; 711/112
See application file for complete search history.

(56) References Cited

U.S. PATENT DOCUMENTS

| | | | |
|---|---|---|---|
| 5,590,304 A * | 12/1996 | Adkisson | 711/100 |
| 5,884,099 A * | 3/1999 | Klingelhofer | 710/52 |
| 6,041,038 A * | 3/2000 | Aimoto | 370/229 |
| 6,272,583 B1 * | 8/2001 | Sakugawa et al. | 710/307 |
| 6,832,300 B2 * | 12/2004 | Naffziger et al. | 711/169 |
| 7,162,550 B2 * | 1/2007 | Douglas | 710/35 |
| 7,230,917 B1 * | 6/2007 | Fedorkow et al. | 370/229 |
| 7,555,590 B2 * | 6/2009 | Elliot et al. | 710/305 |
| 2003/0063605 A1 * | 4/2003 | Ravi et al. | 370/389 |
| 2003/0196058 A1 | 10/2003 | Ramagopal et al. | |
| 2004/0255088 A1 | 12/2004 | Scheuerlein | |
| 2005/0060475 A1 * | 3/2005 | Yamamoto et al. | 710/305 |
| 2007/0283077 A1 * | 12/2007 | Klein et al. | 711/100 |

FOREIGN PATENT DOCUMENTS

GB    2348717 A    10/2000

OTHER PUBLICATIONS

International Search Report and Written Opinion correlating to PCT/IB2007/050756 dated Dec. 5, 2007.

* cited by examiner

*Primary Examiner* — Paul R Myers
*Assistant Examiner* — Christopher A Daley

(57) ABSTRACT

A device and a method, the device has transaction scheduling capabilities, and includes: (i) a memory unit adapted to output data at a first data rate, (ii) a data transaction initiator adapted to receive data at a second data rate that is lower than the first data rate; (iii) a deep pipelined crossbar characterized by a latency; and (iv) a data rate converter connected between the deep pipelined crossbar and the data transaction initiator; wherein the data rate converter is adapted to schedule a transaction of data unit from the memory unit in response to the latency of the deep pipelined crossbar, the first data rate, the second data rate, and size of an available storage space, within the data rate converter allocated for storing data from the memory unit.

20 Claims, 2 Drawing Sheets

DEVICE AND METHOD FOR SCHEDULING TRANSACTIONS OVER A DEEP PIPELINED COMPONENT

FIELD OF THE INVENTION

The present invention relates to devices and methods for scheduling transactions over a deep pipelined component.

BACKGROUND OF THE INVENTION

The increasing complexity of integrated circuits and especially the introduction of multiple cores (processors) within a single integrated circuit forced integrated circuit designers to develop deep pipe-lined interconnects as well as to try and re-use previously designed cores.

The re-use must take into account that various cores, peripherals and memory units are adapted to operate at different frequencies and/or using buses that differ from each other by their width.

Connecting a high speed core via a data rate converter and a deep pipelined crossbar to a slower memory unit may cause data rate converter overflow as well as inefficient usage of the pipeline.

There is a need to provide a device and method for scheduling data transactions over a deep pipelined component.

SUMMARY OF THE PRESENT INVENTION

A device and a method for scheduling transactions over a deep pipelined component, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

Conveniently, a device having transaction scheduling capabilities is provided. The device includes: (i) a memory unit adapted to output data at a first data rate, (ii) a data transaction initiator adapted to receive data at a second data rate that is lower than the first data rate; (iii) a deep pipelined crossbar characterized by a latency; and (iv) a data rate converter connected between the deep pipelined crossbar and the data transaction initiator; wherein the data rate converter is adapted to schedule a transaction of data unit from the memory unit in response to the latency of the deep pipelined crossbar, the first data rate and the second data rate, and size of an available storage space, within the data rate converter (40) allocated for storing data from the memory unit.

Conveniently, a method for scheduling transactions is provided. The method includes: (i) scheduling, by a data rate converter, a transaction of the data unit from a memory unit and over a deep pipelined crossbar, in response to a latency of the deep pipelined crossbar, the first data rate and the second data rate, and size of an available storage space, within the data rate converter, allocated for storing data from the memory unit; (ii) generating a transaction request in response to the scheduling; (iii) receiving a data unit from a memory unit at a first data rate, and (iv) providing the data unit to a transaction initiator at a second data rate that is higher than the first data rate.

Figure 1:
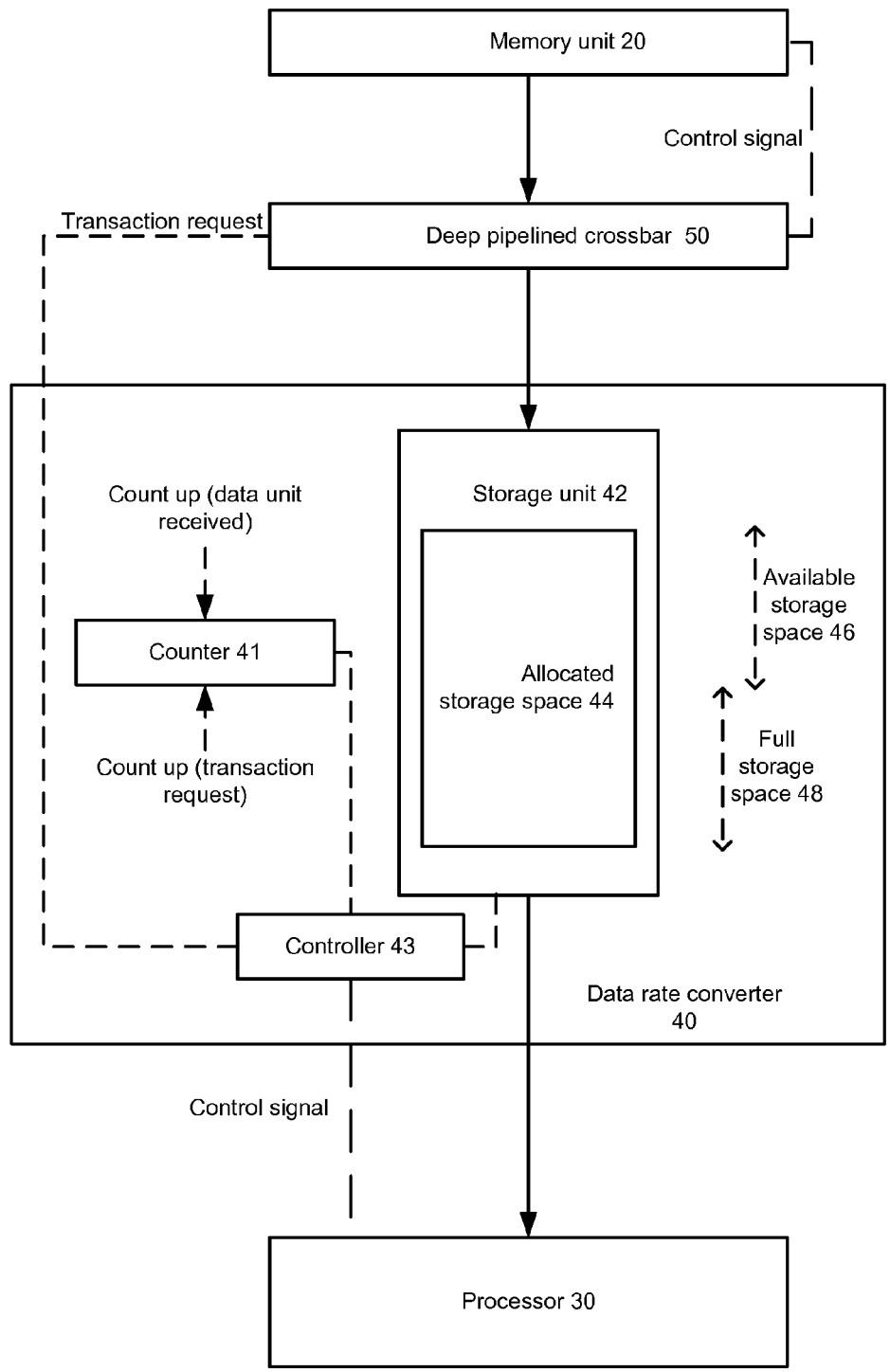
FIG. 1 illustrates a device having scheduling transactions capabilities according to an embodiment of the invention.

FIG. 1 illustrates device 10 having scheduling transactions capabilities over a deep pipelined component according to an embodiment of the invention.

Device 10 can be a mobile device such as a mobile phone, media player, personal data accessory, laptop computer, palm computer and the like or a stationary device such as a server, a desktop computer and the like. Device 10 can include one or more integrated circuit, can include a system on chip and can include one or more memory units, memory controllers, processors (cores), peripherals, direct memory address controllers, crossbars and the like.

FIG. 1 illustrates an exemplary device 10 that includes memory unit 20, a data transaction initiator such as processor 30, deep pipelined crossbar 50 and data rate converter 40. It is noted that device 10 can include other components, additional components or alternative components. For example, data transaction initiator can differ from a processor.

Memory unit 20 is connected via deep pipelined crossbar 50 to data rate converter 40. Data rate converter 40 is also connected to processor 30. Conveniently, the data rate converter 40 is adapted to receive data from deep pipelined crossbar 50 at a first data rate that is higher the second data rate in which processor 30 can receive the data from data rate converter 40.

The different data rate usually results from using wider connections (wider busses) between deep pipelined crossbar 50 and data rate converter 40 than the connections between processor 30 and data rate converter 40. Accordingly, data rate converter 40 performs bus width conversion. A ration of 2:1 was used by the inventors. It is also noted that the bit rate differences can also result from different clock rates.

According to various embodiments of the invention, the data rate converter 40 includes controller 43 that schedules one or more transaction request to the memory unit 20 (over deep pipelined crossbar 50) and then generates the transaction requests in response to the scheduling.

The data rate converter 40 includes (in addition to controller 43) a storage unit 42 that includes an allocated storage space 44 that is allocated for storing one or more data units that are received from deep pipelined crossbar 50 and are aimed to be sent to processor 30. The allocated storage space 44 can include the entire space of storage unit 42 although this is not necessarily so.

Controller 43 can send control signals to storage unit 42, to counter 41 as well as to deep pipelined crossbar 50 and processor 30. These control signals can be transaction requests to deep pipelined crossbar 50 but this is not necessarily so. It is noted that deep pipelined crossbar 50 and memory unit 20 can exchange control signals and that processor 30 can exchange control signals with data rate converter 40. The control signals relate to the data transfer from memory unit 20, through deep pipelined crossbar 50 and to processor 30. The processor 30 can request data by sending one or more control signals to data rate converter 40.

It is further noted that in device 20 a components that requests to receive a data unit has to guarantee that it can also receive the requested data unit. Data rate converter 40 schedules transaction requests when it can eventually receive the requested data unit.

At a given moment allocated storage space 44 can be empty, full or partially full. The allocated storage space that is empty at a certain point in time is referred to as available storage space 46. The allocated storage space that is full at a certain point in time is referred to as full storage space 48.

The latency of deep pipelined crossbar 50 can exceed 10 cycles. It is usually longer and even much longer that a time period required for filling available storage space 44.

Data rate converter 40 can send transaction requests to memory unit 20 even when the allocated memory space is full. It does not wait until the available memory space starts to empty, and relays on the latency of the deep pipelined crossbar 50 as well as on the retrieval of stored data units by processor 30 to guarantee that when a requested data unit arrives to the data rate converter 40 the storage space will be at least slightly emptied such as to receive the requested data unit.

Data rate converter 40 is adapted to generate transaction requests and to determine (count or calculate) the aggregate size of data units that were requested (from memory unit 20) but did not reach yet (due to the latency of deep pipelined crossbar 50) the data rate converter 40 by using counter 41. Counter 41 counts up when a transaction request of a data unit is sent to deep pipelined crossbar 50. Counter 41 counts down when a data unit is received from deep pipelined crossbar 50. The count-up as well as the count-down are responsive to the size of the received/requested data units.

the size of the data unit to be requested from storage unit 20; (ii) an aggregate size of data units requested from memory unit 20 that did not reach the data rate converter 40.

According to another embodiment of the invention the data rate converter 40 is adapted to issue a request to receive a data unit of a certain size (PR) if:

$$PR \leq ML - \mathrm{MAX}(0, OL - L*DR2 + \mathrm{MIN}(L*DR1, AL)).$$

Wherein ML is the size of allocated memory space 44. OL is the size of full storage space 48. L is the latency of deep pipelined crossbar 50. DR2 is the second data rate. DR1 is the first data rate. AL is the size of available storage space 46. MAX represents a find maximum value operation. MIN represents a find minimum value operation. The symbol $\leq$ represents a "not greater than" relationship.

Conveniently, data rate converter 40 is adapted to generate multiple request transactions simultaneously. These are also referred to as transaction request bursts.

The following example will further illustrate the operation of device 10. It is assumed that data rate converter 40 includes an allocated storage space 44 that cat store four data lines.

It is also assumed that the first bit rate is two data line per cycle while the second data rate is one data line per cycle. It is further assumed that the latency of deep pipelined crossbar 50 is twelve cycles.

TABLE 1 illustrates the state of available storage space 44 during multiple cycles. It is assumed that each transaction request includes a request to receive a single data line.

TABLE 1

| Cycle number | Transaction requests generated by data rate converter 40 (size in data lines) | Data received from deep pipe-lined crossbar 50 (size in data lines) | Data sent to processor 30 (size in data line) | Size (in data lines) of available allocated storage space |
|---|---|---|---|---|
| 1-8 | 1 data line each cycle | — | — | 4 |
| 9-10 | — | — | — | 4 |
| 11 | 1 | — | — | 4 |
| 12 | 1 | — | — | 4 |
| 13 | — | 1 | 0.5 | 4 |
| 14 | — | 1 | 0.5 | 3 |
| 15 | 1 | 1 | 0.5 | 2.5 |
| 16 | 1 | 1 | 0.5 | 2 |
| 17 | — | 1 | 0.5 | 1.5 |
| 18 | — | 1 | 0.5 | 1 |
| 19 | + | 1 | 0.5 | 0.5 |
| 20 | + | 1 | 0.5 | 0 |
| 21 | — | — | 0.5 | 0.5 |
| 22 | — | — | 0.5 | 1 |
| 23 | + | 1 | 0.5 | 0.5 |
| 24 | + | 1 | 0.5 | 0 |
| 25 | — | — | 0.5 | 0.5 |
| 26 | — | — | 0.5 | 1 |
| 27 | + | 1 | 0.5 | 0.5 |
| 28 | + | 1 | 0.5 | 0 |

Data rate converter 40 is adapted to schedule a transaction of a data unit from memory unit 20 in response to the latency of the deep pipelined crossbar 50, the first data rate and the second data rate, and the size of available storage space 46.

According to various embodiments of the invention data rate converter 40 can also schedule a transaction request in response to at least one of the following parameters, as well as in response to a combination of multiple parameters out of: (i)

TABLE 1 illustrates a deep pipelined crossbar 50 utilization of fifty percent. Using prior art scheduling methods that initiated a transaction request only if the available space is not full results in a utilization of thirty five percent.

TABLE 2 illustrates the state of available storage space 44 during multiple cycles. It is assumed that data rate converter 40 generated transaction requests bursts. Each transaction request includes a request to receive a data unit that is one data line long.

TABLE 2

| Cycle number | Transaction requests generated by data rate converter 40 (size in data lines) | Data received from deep pipelined crossbar 50 (size in data lines) | Data sent to processor 30 (size in data lines) | Size (size in data lines) of available allocated storage space |
|---|---|---|---|---|
| 1 | 4 | — | — | 4 |
| 2 | 4 | — | — | 4 |
| 3-10 | — | — | — | 4 |
| 9-10 | — | — | — | 4 |
| 11 | 4 | — | — | 4 |
| 12 | — | — | — | 4 |
| 13 | — | 1 | 0.5 | 3.5 |
| 14 | — | 1 | 0.5 | 3 |
| 15 | — | 1 | 0.5 | 2.5 |
| 16 | — | 1 | 0.5 | 2 |
| 17 | — | 1 | 0.5 | 1.5 |
| 18 | — | 1 | 0.5 | 1 |
| 19 | 4 | 1 | 0.5 | 0.5 |
| 20 | — | 1 | 0.5 | 0 |
| 21 | — | — | 0.5 | 0.5 |
| 22 | — | — | 0.5 | 1 |
| 23 | — | 1 | 0.5 | 0.5 |
| 24 | — | 1 | 0.5 | 0 |
| 25 | — | 1 | 0.5 | 0 (?) |
| 26 | — | 1 | 0.5 | 0 (?) |
| 27 | 4 | — | 0.5 | 0 |
| 28 | — | — | 0.5 | 0 |

TABLE 2 illustrates a deep pipelined crossbar 50 utilization of fifty percent. Using prior art scheduling methods that initiated a transaction request only if the available space is not full results in a utilization of thirty five percent.

Figure 2:
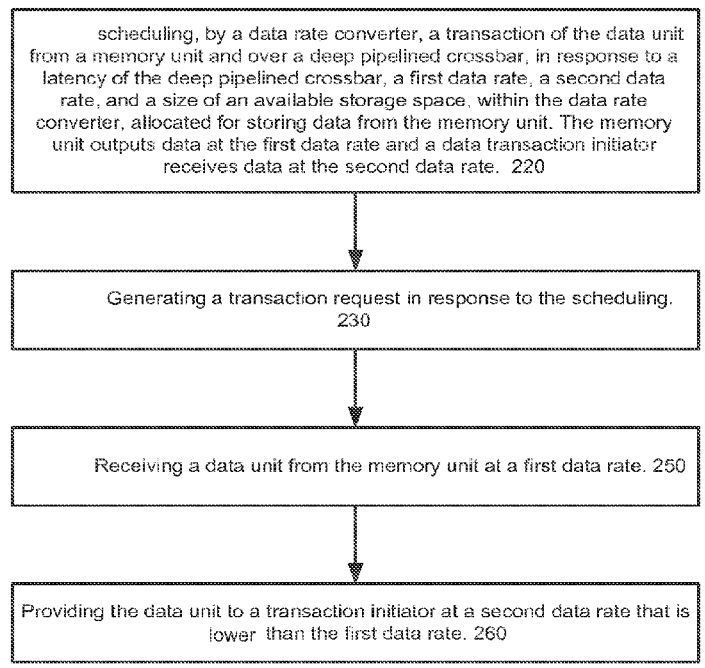
FIG. 2 illustrates a method for scheduling transactions over a deep pipelined component, according to an embodiment of the invention.

FIG. 2 illustrates method 200 for scheduling transactions over a deep pipelined component, according to an embodiment of the invention.

Method 200 starts by stage 220 of scheduling, by a data rate converter, a transaction of a data unit from a memory unit and over a deep pipelined crossbar, in response to a latency of the deep pipelined crossbar, a first data rate, a second data rate, and a size of an available storage space, within the data rate converter, allocated for storing data from the memory unit. The memory unit output data at the first data rate and a data transaction initiator received data at the second data rate.

Conveniently, the first data rate is at least twice the second data rate.

The scheduling can be triggered by one or more requests to receive data units by a data request initiator.

Conveniently, stage 220 of scheduling includes determining (counting or calculating) the aggregate size of data units that were requested (from the memory unit) but did not reach yet (due to the latency of a deep pipelined crossbar) the data rate converter. This can be done by utilizing a counter such as counter 41 of FIG. 1.

Conveniently, stage 220 of scheduling includes scheduling a transaction request in response to at least one of the following parameters, as well as in response to a combination of multiple parameters out of: (i) the size of the data unit to be requested from the storage unit; (ii) an aggregate size of data units requested from the memory unit that did not reach the data rate converter.

Conveniently, the scheduling includes scheduling a transaction request when: $PR \leq ML - MAX(0, OL - L*DR2 + MIN(L*DR1, AL))$. Wherein PR is the size of requested data unit, ML is the size of available storage space, ML is the size of allocated memory space 44, OL is the size of full storage space, L is the latency of deep pipelined crossbar, DR2 is the second data rate, DR1 is the first data rate, AL is the size of available storage space, MAX represents a find maximum value operation, MIN represents a find minimum value operation, and the symbol $\leq$ represents a "not greater than" relationship.

Stage 220 is followed by stage 230 of generating a transaction request in response to the scheduling.

Conveniently, stage 230 includes generating a transaction request when the storage space is full.

Conveniently, the stage 230 includes generating a transaction request burst. Exemplary transaction request bursts are illustrated in TABLE 2.

According to an embodiment of the invention stage 230 includes generating (and sending) transaction requests to a memory unit even when the allocated memory space is full.

Stage 230 is followed by stage 250 of receiving a data unit from the memory unit at a first data rate.

Stage 250 is followed by stage 260 of providing the data unit to a transaction initiator at a second data rate that is lower than the first data rate.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having transaction scheduling capabilities; the device comprising:
    a memory unit adapted to output data at a first data rate;
    a data transaction initiator adapted to receive data at a second data rate that is lower than the first data rate;
    a deep pipelined crossbar characterized by a latency; and
    a data rate converter coupled between the deep pipelined crossbar and the data transaction initiator, the data rate converter including a storage space for storing data from the memory unit;
    wherein the data rate converter is adapted to schedule a transaction of a data unit from the memory unit in response to the latency of the deep pipelined crossbar, the first data rate, the second data rate, an aggregate size of data units requested from the memory unit that did not reach the data rate converter, and a size of an available space within the storage space.

2. The device according to claim 1 wherein the data rate converter is adapted to generate a transaction request when the storage space is full.

3. The device according to claim 1 wherein the data rate converter is adapted to schedule the transaction of the data unit in response to a size of the data unit.

4. The device according to claim 1 wherein the data rate converter comprises a counter to count the aggregate size of data units requested from the memory unit that did not reach the data rate converter and to decrement a count of the aggregate size in response to a determination that a data unit reached the data rate converter.

5. The device according to claim 1 wherein the data rate converter is adapted to issue a request to receive a data unit of a certain size if the certain size does not exceed the following expression:

ML−MAX(0,OL−L*DR2+MIN(L*DR1,AL));

wherein ML is the size of the storage space, within the data rate converter, allocated for storing data from the memory unit, OL is the size of occupied storage space within the storage space;

L is the latency of the deep pipelined crossbar;

DR2 is the second data rate, DR1 is the first data rate and AL is an available storage space within the storage space;

MAX represents a find maximum value operation, and MIN represents a find minimum value operation.

6. The device according to claim 1 wherein the latency of the deep pipe lined crossbar exceeds 10 cycles.

7. The device according to claim 1 wherein the first data rate is at least twice the second data rate.

8. The device according to claim 1 wherein the data rate converter is adapted to generate transaction request bursts.

9. The device according to claim 1 wherein the data rate converter is adapted to perform bus width conversion.

10. The device according to claim 1 wherein the latency of the deep pipelined crossbar is longer than a time period required for filling the storage space.

11. A method for scheduling data transaction; the method comprising:

receiving a data unit from a memory unit at a first data rate;

providing the data unit to a transaction initiator at a second data rate that is lower than the first data rate;

scheduling, by a data rate converter, a transaction of the data unit from the memory unit and over a deep pipelined crossbar, in response to a latency of the deep pipelined crossbar, the first data rate, the second data rate, and a size of an available storage space, within the data rate converter, allocated for storing data from the memory unit; and generating a transaction request in response to the scheduling, wherein the generating comprises generating a transaction request when the storage space is full.

12. The method according to claim 11 wherein the scheduling comprises scheduling the transaction in response to a size of the data unit.

13. The method according to claim 11 wherein the scheduling comprises scheduling in response to an aggregate size of data units requested from the memory unit that did not reach the data rate converter.

14. The method according to claim 13 wherein the method comprises counting, by a counter, the aggregate size of data units requested from the memory unit that did not reach the data rate converter, the counting comprising decrementing a count of the aggregate size in response to a determination that a data unit reached the data rate converter.

15. The method according to claim 11 wherein the scheduling comprises scheduling a transaction of a data unit of a certain size if the certain size does not exceed the following expression:

ML−MAX(0,OL−L*DR2+MIN(L*DR1,AL));

wherein ML is the size of the storage space, within the data rate converter, allocated for storing data from the memory unit, OL is the size of occupied storage space within the storage space;

L is the latency of the deep pipelined crossbar;

DR2 is the second data rate, DR1 is the first data rate and AL is an available storage space within the storage space;

MAX represents a find maximum value operation, and MIN represents a find minimum value operation.

16. The method according to claim 11 wherein the first data rate is at least twice the second data rate.

17. The method according to claim 11 wherein the generating comprises generating transaction request bursts.

18. The method according to claim 11 wherein the scheduling comprises scheduling the transaction in response to a size of the data unit.

19. The method according to claim 11 wherein the scheduling comprises scheduling in response to an aggregate size of data units requested from the memory unit that did not reach the data rate converter.

20. The method according to claim 11 wherein the scheduling comprises scheduling in response to the latency, wherein the latency of the deep pipelined crossbar is longer than a time period required for filling the storage space.

* * * * *